Aug. 5, 1969 B. L. LEWIS 3,460,103
FERROELECTRIC MEMORY DEVICE
Filed Nov. 22, 1966
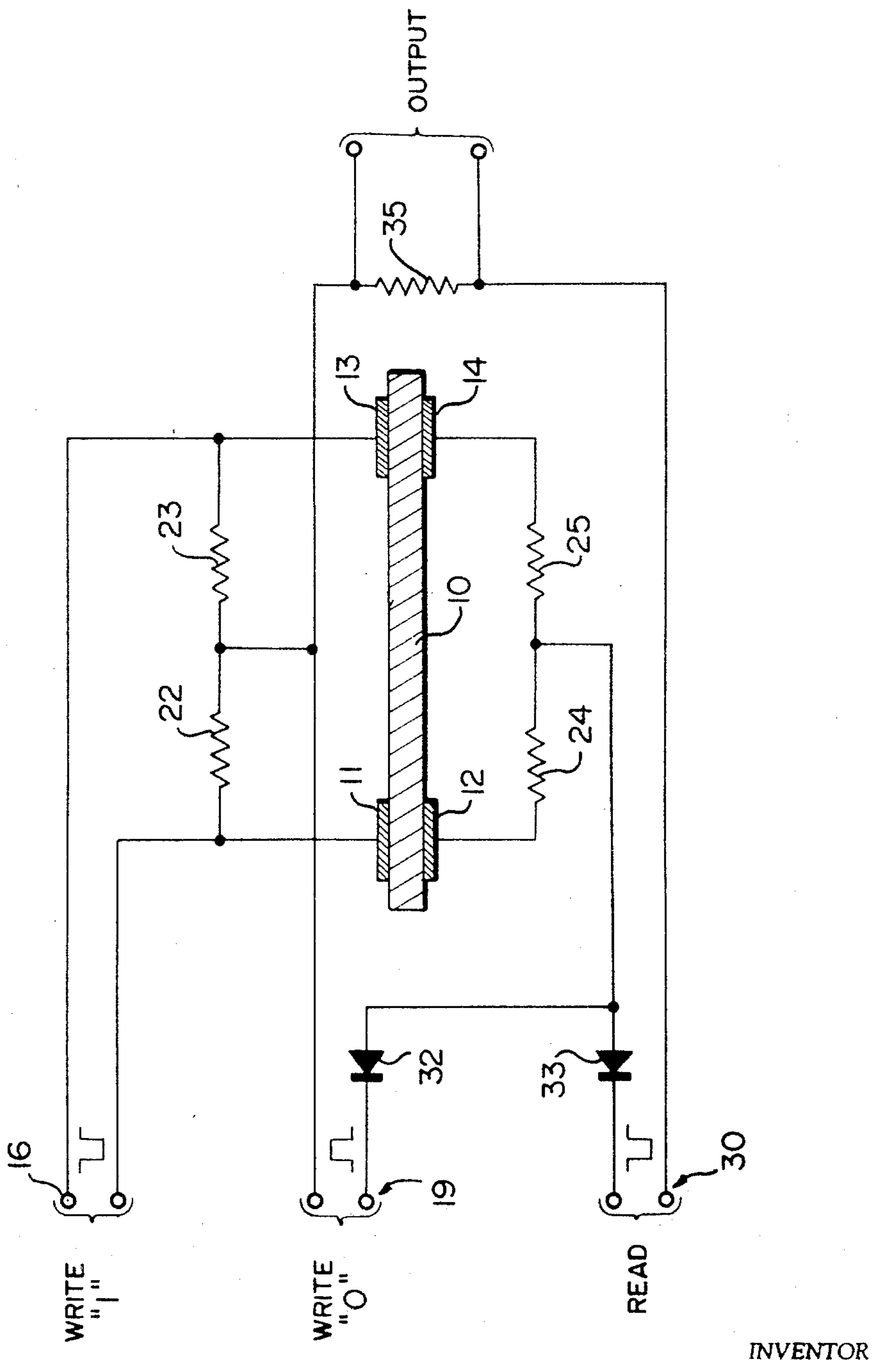
INVENTOR
BERNARD L. LEWIS
BY Hurvitz, Rose & Greene
ATTORNEYS 3,460,103

FERROELECTRIC MEMORY DEVICE

Bernard L. Lewis, Satellite Beach, Fla., assignor to Radiation Incorporated, Melbourne, Fla., a corporation of Florida Filed Nov. 22, 1966, Ser. No. 596,210
Int. Cl. G11b 9/02
U.S. Cl. 340—173.2 8 Claims

ABSTRACT OF THE DISCLOSURE

A binary storage device includes a slab of ferroelectric material having on opposite surfaces thereof two pairs of capacitor plates, each pair of plates consisting of two confronting electrodes on the opposite surfaces. Two input circuits are connected to the pairs of capacitor plates in an arrangement such that application of a pulse representing a bit of one value to one input circuit polarizes the ferroelectric slab to maximize the capacitance between the plates, whereas application of a pulse representing a bit of the other value to the other input circuit polarizes the ferroelectric slab to minimize the capacitance between the plates. The value of the stored bit is read out using a separate read circuit connected to the capacitor plates and to a resistance in series therewith, so that the level of a pulse applied to the read circuit, as sensed across the resistor, will vary according to the reactance and hence the capacitance value of the capacitor, without destroying the stored value.

The present invention relates generally to memory devices and more particularly to ferroelectric storage devices for retention and recovery of digital data.

In the past a wide variety of devices have been utilized for the storage of digital data, among these being the electrostatic storage devices such as the so called Williams tube, recruiting delay line loops, capacitor storage, ferroelectric storage, and storage on a magnetic surface or in a ferromagnetic device. The ferromagnetic device has become extremely popular because of the capability of fabrication in miniature and microminiature form. Large storage capacities for ferromagnetic memories have been provided, for example, in the form of thin films which are capable of substantially permanent storage of binary data because these devices exhibit a permanent magnetic moment. Since these devices are current controlled, however, the power losses and circuit heating are often rather severe. In addition, magnetic thin film memories have a relatively slow response time.

It is a broad object of the present invention to provide a ferroelectric memory device possessing a number of advantages over prior art memory devices.

The broad concept of using ferroelectric materials in digital storage devices is, of course, old. It is known, for example, to provide a slab of ferroelectric material such as barium titanate with electrodes on opposite surfaces thereof. Application of a voltage difference of sufficient magnitude across the electrodes polarizes the ferroelectric material and this state of polarization coninues to exist irrespective of removal of the applied voltage or short circuiting of the electrodes. A reversal of polarity of the applied voltage across the electrodes will, however, result in a change in direction of polarization of the ferroelectric material. Accordingly, this type of ferroelectric device is useful as a binary storage element, the storage of a binary zero being represented by polarization in one direction and the storage of a binary one represented by polarization in the opposite direction. Having written in a bit of information, that same bit may subsequently be read out by application of a voltage difference of predetermined polarity and of the aforementioned sufficient magnitude to produce polarization across the electrodes. If the applied readout voltage pulse is of such polarity as to produce no change in polarization of the ferroelectric material, that is, if the "read" pulse is of the same polarity as the immediately preceding "write" pulse, then very little current flows through the ferroelectric slab. On the other hand, if the read pulse is of such polarity as to produce a change in polarization of the ferroelectric, a substantial amount of current flows through the circuit in series with the ferroelectric slab. A simple form of prior art circuit utilizes a resistor in series with the electrodes of the slab, across which the output of the device is taken. The value of the stored bit of data is characterized by the size or magnitude of the output signal. This type of arrangement, however, provides a destructive readout since a read pulse of such polarity as to produce a change in polarization resets the storage device, e.g., from "1" to "0," or vice versa.

It is a further object of the present invention to provide a ferroelectric memory device from which stored binary data may be retrieved without loss of the originally stored bit value unless and until a new bit value is to be written into the device.

It is another object of the present invention to provide a memory device having a high input impedance, capable of fabrication in microminiature form, having a fast response time, and into which binary data may be entered without excessive heating of the device or excessive power losses.

Briefly, the above and still further objects of the present invention are achieved in accordance with an embodiment thereof, wherein a slab of ferroelectric material is provided with separate pairs of electrodes or capacitor plates on opposite surfaces thereof. A write pulse for storage of one binary value is applied across the separate pairs of capacitor plates and causes polarization of the ferroelectric slab to minimize the capacitance between the plates. Application of a pulse for storage of a bit of the opposite value results in polarization of the ferroelectric material in a direction to maximize the capacitance between the capacitor plates. A low amplitude read pulse is applied to the ferroelectric slab via the electrodes thereof and to a resistor in series therewith to produce voltage division between the capacitance of the electrodes and the series resistance. Since the capacitance between the plates is maximized or minimized, according to the value of the bit stored, the size of pulse across the resistance determines the value of the stored bit. Unlike prior art ferroelectric storage devices the read voltage pulse may be of low magnitude, insufficient to produce a change in the condition of polarization; hence, nondestructive readout is obtained.

It is therefore a further object of the present invention to provide a ferroelectric memory device wherein storage and non-destructive readout of binary data is achieved with a minimum of power application.

Another object of the invention is to provide a ferroelectric memory device of the type briefly discussed above wherein separate write inputs are provided for storing zeros and ones, and a single read input provided to sense the value of the stored bit.

The above and still further objects, features and attendant advantages of the present invention will become apparent from a consideration of the following detailed description of a specific exemplary embodiment thereof, especially when taken in conjunction with the accompanying drawings, in which:

The sole figure is a circuit diagram of a preferred embodiment of the invention.

Referring to the drawing, the ferroelectric memory device includes a slab 10 of ferroelectric material, such as barium titanate, having two separate pairs of capacitor plates or electrodes on opposite surfaces thereof, plates 11 and 12 constituting one pair and plates 13 and 14 the other pair. The capacitor plates or electrodes 11, 12, 13, 14 may be comprised of any conductive material, such as copper, and may be deposited on the respective faces of the ferroelectric slab, which is preferably a single crystal of thickness less than .01 inch, in any convenient and conventional manner, such as by vapor deposition.

A pair of input terminals 16 is connected via respective leads to plates 11 and 13 on the same surface of ferroelectric slab 10. A second pair of input terminals 19 is also provided, one of the latter terminals being connected to both capacitor plates 11 and 13 via respective resistances 22 and 23 and the other terminal connected to plates or electrodes 12 and 14, on the opposite surface of ferroelectric slab 10, via respective resistances 24 and 25. Resistances 22, 23, 24 and 25 are preferably of the same resistance value.

A third pair of terminals 30 is also connected across the electrodes, one of terminals 30 being connected to the junction of resistances 22 and 23, via another resistance 35, and the other of terminals 30 being connected to the junction of resistance 24 and 25. Diodes 32 and 33 are employed to isolate the two pairs of terminals 19 and 30. The output of the device is taken across resistance 35, the latter resistance having a value much greater than the value of any of resistances 22, 23, 24, 25, for reasons which will subsequently become clear.

In the embodiment shown, application of a negative pulse to input terminal 16 results in entry of a binary "1" into the ferroelectric storage device. Accordingly, input terminals 16 are referred to as the write "one" terminals of the device. A negative voltage pulse on the write "one" input terminals results in the application of a voltage difference between electrodes 11 and 13 of slab 10 tending to polarize the ferroelectric in a direction that maximizes the capacitance between plates 11 and 12 and plates 13 and 14.

Similarly, a positive voltage pulse on terminal pair 19, designated the write "zero" input terminals, results in existence of a positive voltage on each of plates 11 and 13 relative to each of plates 12 and 14, respectively. Therefore, the write "zero" pulse polarizes the ferroelectric in a direction to minimize the capacitance between the two pairs of plates.

It should be emphasized that the value of the bits stored in the ferroelectric memory device of the present invention does not depend upon reversal of direction of polarization as in prior art ferroelectric storage devices, but rather upon relative values of capacitance.

Application of a low amplitude read pulse, of negative polarity in the case of the embodiment shown in the figure, across "read" input terminals 30 results in a voltage division between the two pairs of capacitors and the resistance 35. For polarization producing maximum capacitance value, the two pairs of capacitors exhibit low reactive impedance so that a large portion of the total amplitude of the read pulse appears across resistance 35, indicating that a binary "one" is stored in the ferroelectric memory. On the other hand, a minimum value of capacitance across capacitors 11, 12 and 13, 14 results in a high reactive impedance and a large voltage drop across the capacitors. Accordingly, a very small amplitude pulse appears across resistance 35, indicating that a "zero" is stored in the ferroelectric memory device.

The value of each of resistances 22, 23, 24 and 25 is very small in comparison with the value of resistance 35 to prevent any substantial voltage drop across those resistances in comparison with the drop which may occur across resistance 35.

While I have disclosed a preferred embodiment of my invention, it will be apparent to those skilled in the art to which the invention pertains that variations in the specific details of construction which have been illustrated and described may be resorted to without departing from the spirit and scope of the invention as defined in the appended claims.

I claim:

1. A binary memory device comprising a slab of ferroelectric material, plural pairs of capacitor plates, each pair of capacitor plates comprising confronting electrodes on opposite sides of said slab, a circuit for applying voltage pulses to predetermined ones of said capacitor plates to polarize said ferroelectric slab to maximize the capacitance between said plural pairs of capacitor plates, thereby storing one binary value, another circuit for applying voltage pulses to predetermined ones of said capacitor plates to polarize said ferroelectric slab to minimize the capacitance between said plural pairs of capacitor plates, thereby storing the other binary value, and a further circuit including a resistance connected in series with said plural pairs of capacitor plates connected in parallel, for applying voltage pulses across said plural pairs of capacitor plates via said resistance, the magnitude of voltage appearing across said resistance being indicative of the binary values stored.

2. The invention according to claim 1 wherein said plural pairs of capacitor plates constitutes two pairs of capacitor plates.

3. The invention according to claim 2 wherein the voltage pulses applied to said further circuit are of substantially lower magnitude than those applied to either of the first-named circuit and said another circuit.

4. The invention according to claim 2 wherein the first-named circuit includes a pair of input terminals connected respectively to the plates of said two pairs of capacitor plates located on the same surface of said slab; and wherein said another circuit comprises another pair of input terminals, two pairs of resistances, each of the last-named resistances being of substantially equal value, each input terminal of said another pair of input terminals connected respectively to the junction of each of said pairs of resistances, the other end of each resistance of said pairs of resistances connected to a respective separate and distinct capacitor plate; and wherein said further circuit includes a further pair of input terminals, one input terminal of said further pair connected to the junction of one of said pairs of resistances, the other input terminal of said further pair connected to the junction of the other of said pairs of resistances via the first-named resistance.

5. The invention according to claim 4 wherein said first-named resistance has a value relatively greater than that of each of said last-named resistances.

6. The invention according to claim 4 wherein is included means for electrically isolating said another circuit and said further circuit from each other.

7. The invention according to claim 6 wherein said isolating means comprises a diode between an input terminal and the respective junction of the one of said pairs of resistances connected thereto in each of said another circuit and said further circuit, each diode poled to prevent passage of voltage pulses of a polarity opposite the polarity of voltage pulses passed by the diode in the other circuit.

8. The invention according to claim 5 wherein the binary value stored by said device is read out of said device across said first-named resistance.

References Cited

UNITED STATES PATENTS

| | | | |
|---|---|---|---|
| 3,005,976 | 10/1961 | Anderson | 340—173.2 |
| 3,037,196 | 5/1962 | Brennemann | 340—173.2 |
| 3,264,618 | 8/1966 | Wanlass et al. | 340—173.2 |

BERNARD KONICH, Primary Examiner

J. F. BREIMAYER, Assistant Examiner

U.S. Cl. X.R.

317—242